United States Patent
Mclean, Jr. et al.

(10) Patent No.: US 10,530,919 B2
(45) Date of Patent: Jan. 7, 2020

(54) MOBILE ANSWERING DEVICE

(71) Applicants: James Edward Mclean, Jr., Charlotte, NC (US); Edward D. Mclean, San Marcos, TX (US)

(72) Inventors: James Edward Mclean, Jr., Charlotte, NC (US); Edward D. Mclean, San Marcos, TX (US)

(73) Assignee: McLeanics Technology Corporation, Charlotte, NC (US)

( * ) Notice: Subject to any disclaimer, the term of this patent is extended or adjusted under 35 U.S.C. 154(b) by 0 days.

(21) Appl. No.: 15/330,585

(22) Filed: Oct. 17, 2016

(65) Prior Publication Data
US 2018/0109681 A1   Apr. 19, 2018

(51) Int. Cl.
*H04M 1/65*    (2006.01)
*H04M 1/725*   (2006.01)

(52) U.S. Cl.
CPC ..... *H04M 1/72547* (2013.01); *H04M 1/6505* (2013.01); *H04M 1/72527* (2013.01)

(58) Field of Classification Search
CPC ....... H04W 4/16; H04M 1/652; H04M 1/663; H04M 3/42314; H04M 1/65; H04M 1/6505
USPC ........................... 455/410, 412.1, 414.1, 420
See application file for complete search history.

(56) References Cited

U.S. PATENT DOCUMENTS

| | | | | |
|---|---|---|---|---|
| 6,574,471 B1* | 6/2003 | Rydbeck | ............... | H04M 1/663 455/418 |
| 6,792,263 B1* | 9/2004 | Kite | ..................... | H04M 1/652 455/412.1 |
| 6,961,559 B1* | 11/2005 | Chow | ............... | H04M 3/42314 455/414.1 |
| 7,224,962 B1* | 5/2007 | Kite | ....................... | H04M 1/65 455/412.1 |
| 8,311,513 B1* | 11/2012 | Nasserbakht | ........ | G06Q 10/109 455/410 |
| 2002/0137503 A1* | 9/2002 | Roderique | ............. | H04W 4/16 455/420 |
| 2015/0358790 A1* | 12/2015 | Nasserbakht | ..... | G06F 17/30088 455/414.1 |
| 2018/0109681 A1* | 4/2018 | Mclean, Jr. | ........ | H04M 1/6505 |

\* cited by examiner

*Primary Examiner* — William D Cumming

(57) ABSTRACT

The Mobile Answering Device (MAD), is a mobile communication system comprising of an electronic device or circuit, software, App, platform, network, computer, or server that attaches to or is installed within, or links to a smart phone, tablet, or laptop. The MAD enables a mobile communication device such as, a smart phone, cell phone, tablet, or laptop to answer an incoming mobile phone call by way of a pre-recorded message. After the message has played, the caller can leave a brief or detailed voice message. During the time that the caller is leaving his or her messages, the user of the mobile communication device can hear the caller's message without the caller's knowledge; thus, enabling the user to pre-screen or monitor his or her mobile phone calls before answering the mobile phone call. Further, the MAD enables a user to send and receive Audio-Video electronic mail (AVEmail).

18 Claims, 6 Drawing Sheets

BLOCK DIAGRAM OF THE AUDIO-VIDEO MESSAGING SYSTEM (AVMS),
Flow Chart Of The Audio-Video Email and MultiMedia Email

Figure 5

MOBILE ANSWERING DEVICE

CROSS REFERENCE TO RELATED APPLICATION

This Application is related to the Mobile Answering Device Provisional Patent Application, Application No. 62/390,034; filed on Mar. 17, 2016.

STATEMENT REGARDING FEDERAL SPONSORED RESEARCH

None Applicable.

REFERENCE TO SEQUENCE LISTING, TABLE, OR A COMPUTER PROGRAM LISTING COMPACT DISC APPENDIX

None Applicable.

BACKGROUND OF INVENTION

The Mobile Answering Device (MAD), is in the field of Mobile Voice messaging and Mobile Voice mail. As of today, the current mobile voice mail technology and mobile communication devices do not allow users to pre-screen or monitor their mobile phone calls before answering the mobile phone call. Therefore, the user may miss a very important mobile phone call or emergency mobile phone call in an effort to avoid an unwanted or annoying mobile phone call; or the user may answer all mobile phone calls, not knowing the subject or details of the mobile phone call, and find himself or herself trapped within an unwanted, inconvenient, or annoying mobile phone call, the MAD can help to prevent such an event.

BRIEF SUMMARY OF INVENTION

The Mobile Answering Device (MAD), is a Mobile Communication System Comprising of an electronic device or circuit, software, Application, (APP), platform, network, computer, or server, that attaches to, or is installed within, or links to, a smart phone, tablet, laptop, or other mobile communication devices. The MAD enables a mobile communication device such as, but not limited to, a smart phone, tablet, laptop, or other mobile communication devices, to answer an incoming mobile phone call by way of a pre-recorded message. After the pre-recorded message has played, the caller can leave a brief or detailed voice message. During the time that the caller is leaving his or her voice message, the user of the mobile communication device can hear the caller's voice message without the caller's knowledge; thus enabling the user to pre-screen or monitor, without detection, his or her mobile phone calls before answering the mobile phone call; therefore, eliminating the possibility of answering an unwanted or inconvenient mobile phone call. Further, the MAD has an Audio-Video Messaging Service (AVMS) feature that enables a user to send and receive pre-recorded audio-video electronic mail (AVEmail) over the internet. And, this feature can be used to send multimedia (Audio-Video and Text) email over the internet.

DETAILED DESCRIPTION OF THE INVENTION

The Mobile Answering Device (MAD), is a Mobile Communication System Comprising of an electronic device or circuit, software, Application, (App), platform, network, computer, or server, that attaches to, or is installed within, or links to, a smart phone, tablet, laptop, or other mobile communication devices. The MAD enables a mobile communication device such as, but not limited to, a smart phone, tablet, laptop, or other mobile communication devices, to answer an incoming mobile phone call by way of a pre-recorded message. After the pre-recorded message has played, the caller can leave a brief or detailed voice message. During the time that the caller is leaving his or her voice message, the user of the mobile communication device can hear the caller's voice message without the caller's knowledge; thus enabling the user to pre-screen or monitor, without detection, his or her mobile phone calls before answering the mobile phone call; therefore, eliminating the possibility of answering an unwanted or inconvenient mobile phone call.

The MAD can provide a software program "App" installed on a mobile communication device. The App will enable the user of the mobile communication device to screen or monitor incoming mobile phone calls by controlling and instructing the functions, components, and hardware of the mobile communication device, and allow callers to leave a brief or detailed voice message directly on the mobile communication device; therefore, eliminating the need for secondary voice mail service, which does not allow any pre-screening or monitoring of mobile phone calls.

The MAD can be an electronic circuit that is incorporated or embedded within the circuitry of a mobile communication device such as, but not limited to, a smart phone, tablet, laptop, or any other mobile communication device. The electronic circuit will enable the user of the mobile communication device to pre-screen or monitor incoming mobile phone calls, and allow callers to leave a brief or detailed voice message directly on the mobile communication device; therefore, eliminating the need for secondary voice mail service, which does not allow any pre-screening or monitoring of mobile phone calls.

The MAD can be an electronic device that is attached to or linked to a mobile communication device such as, but not limited to, a smart phone, cell phone, tablet, laptop, wearable such as, a smart watch, or any other mobile communication device, by means of a USB connection, wire connectivity means, or some other connection means such as, but not limited to, BLUETOOTH, WIFI, or any other wireless connection means or protocols. Once the MAD is attached to or connected to a mobile communication device, the MAD will enable the user of the mobile communication device to pre-screen or monitor incoming mobile phone calls, and allow callers to leave a brief or detailed voice message directly on the mobile communication device; therefore, eliminating the need for secondary voice mail service, which does not allow any pre-screening of mobile phone calls.

The MAD will enable a user of a mobile communication device to store voice messages directly on the user's mobile communication device such as, but not limited to, a smart phone, tablet, laptop, mobile computer, two way radio, wearable communication device such as, but not limited to, a smart watch, or any other mobile communication devices, or the user can upload the voice message to a platform, network, server, or any other computer device or mobile communication device for storage.

For the purposes herein, a mobile communication device is defined as a smart phone, cell phone, tablet, laptop, mobile computer, two way radio, a wearable communication device such as, but not limited to, a smart watch; and, a sever is defined as a hosting server, server, network, platform, remote server, remote computer, and computer; and a program is defined as a software program, application (App), utility files, operating system, and drivers.

As of today, the current mobile voice mail technology and mobile communication devices do not allow users to pre-screen or monitor their mobile phone calls before answering the mobile phone call. Therefore, the user may miss a very important mobile phone call or emergency mobile phone call in an effort to avoid answering an unwanted or annoying mobile phone call; or the user may answer all mobile phone calls, not knowing the subject or details of the mobile phone call, and find himself or herself trapped within an unwanted, inconvenient, or annoying mobile phone call, the MAD can help to prevent such an event.

Further, the MAD has an Audio-Video Messaging Service (AVMS) feature that enables a user to send and receive pre-recorded audio-video electronic mail (AVEmail) over the internet. And, this feature can be used to send multimedia (Audio-Video and Text) emails over the internet. This is accomplished by installing the MAD's provided software or App on a hosting server and a mobile communication device or computer device such as, but not limited to, a desk top computer device, laptop, tablet, smart phone, or any other communication device capable of sending and receiving an audio-video internet signal. The mobile communication device or computer device initiates the pre-recorded audio-video email by activating/accessing the pre-installed MAD software or App and selecting the AVMS feature. Then, the individual poses in front of the mobile communication or computer device's camera, press the record button or icon, speak into or towards the microphone of the mobile communication or computer device, then the MAD generates an audio-video message. This audio-video message is then temporarily stored into the memory of the mobile communication device or computer device, and/or temporarily stored on a hosting server, network, platform, or any other computer device. Then, from the mobile communication device or computer device, the user enters a target email address for the receiving party, to where the audio-video message is to be sent; then, by pressing the send button or icon in the MAD's provided software program or App, the audio-video message will be sent to the target email address. This is accomplished by the hosting server, network, or platform, storing the audio-video email message and relaying, to the receiving party, a special email message link that provides a direct path to the stored audio-video message file stored on the hosting server, network, or platform; or the audio-video email message can be sent directly to the target email address (receiving party). Once the receiving party receives notice of the audio-video email massage, the receiving party can click on the special link provided, this link will instantly load the audio-video message and allow it to be viewed and heard by the receiving party.

Unlike most email messages today that only provide text and some attachments or downloads, the MAD's AVMS feature allows a user to see and hear the actual massage as the original sender had intended for it to be conveyed; therefore, no more guessing about the mood or expression of an email message. With the MAD's AVMS feature, a user can see the worm facial expression and hear the soft, sincere voice of a love one, see the happy face of a child and hear their giggles and laughter. With the MAD's AVMS feature, the email message comes alive and speaks for itself.

The MAD also has a feature that provides live audio and video streaming.

Figure 1:
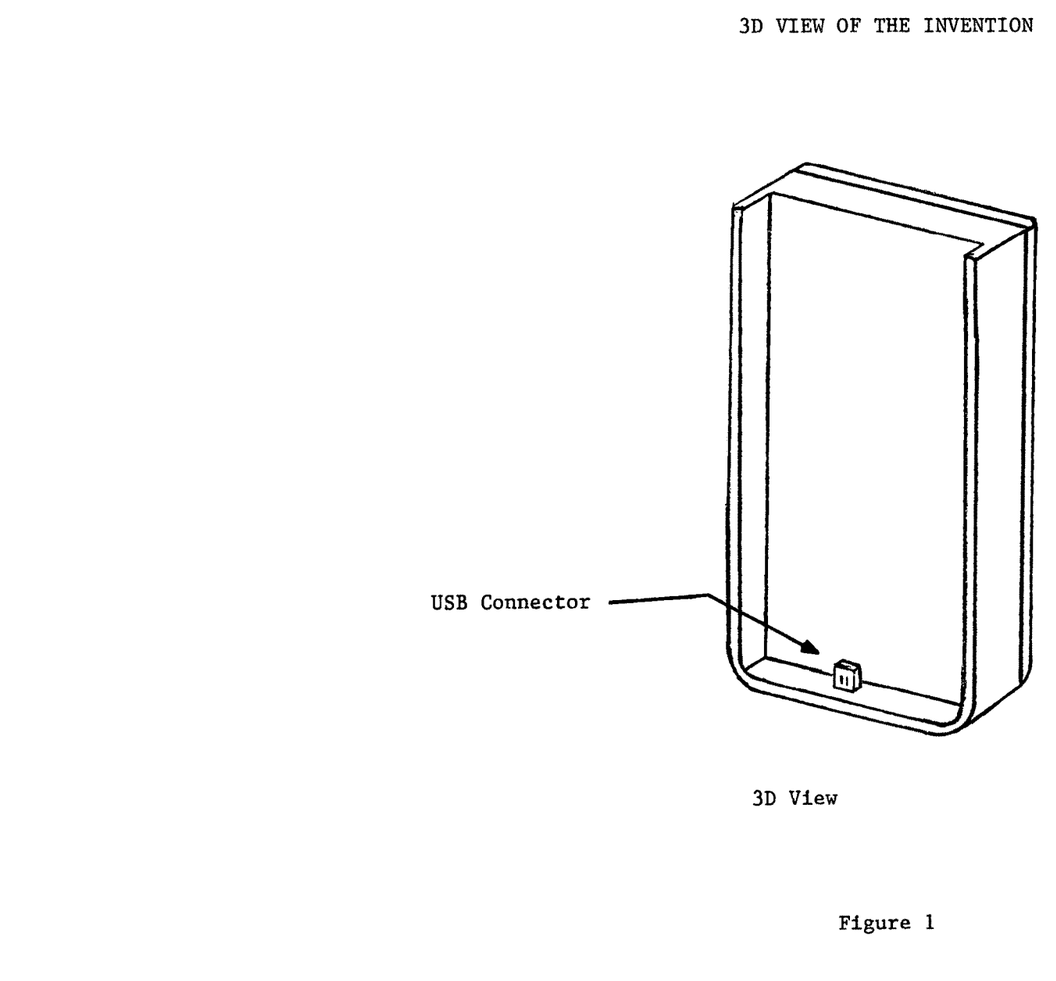
FIG. 1, is the 3D View of the Invention.
Figure 3:
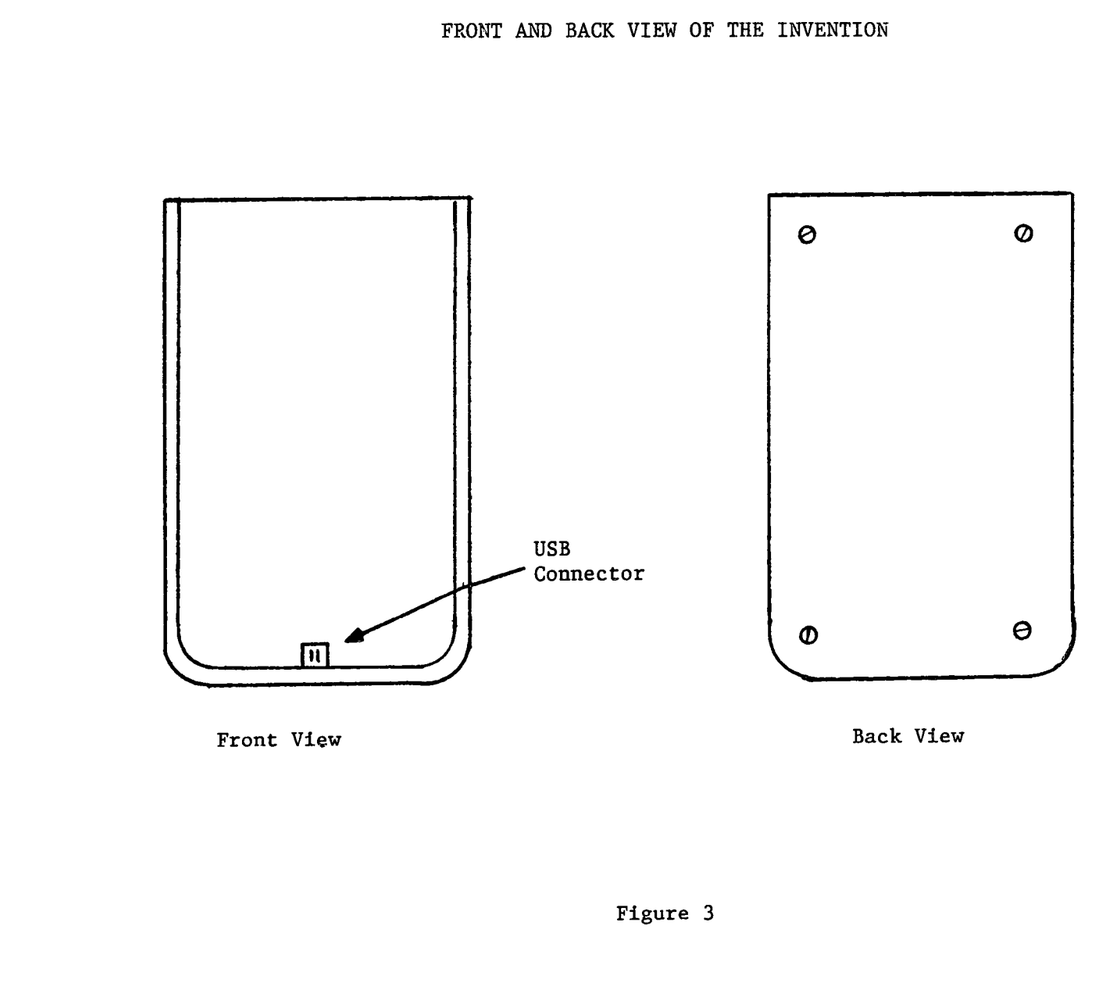
FIG. 3, is the Front and Back View of the Invention.
Figure 4:
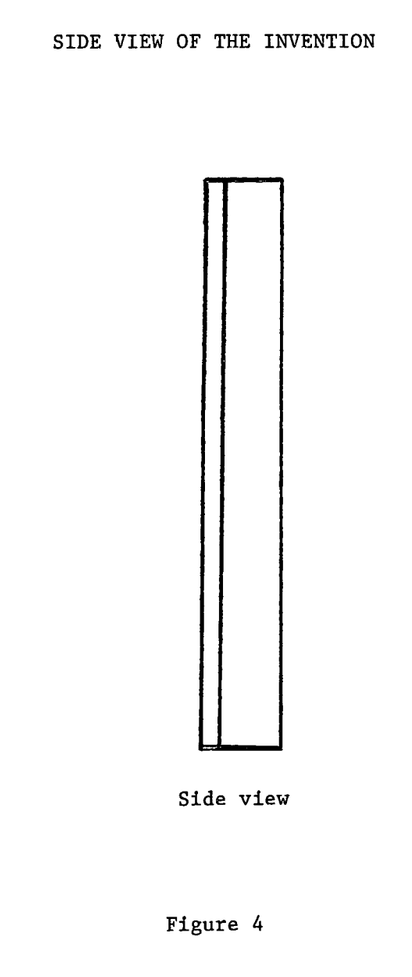
FIG. 4, is the Side View of the Invention.
Figure 5:
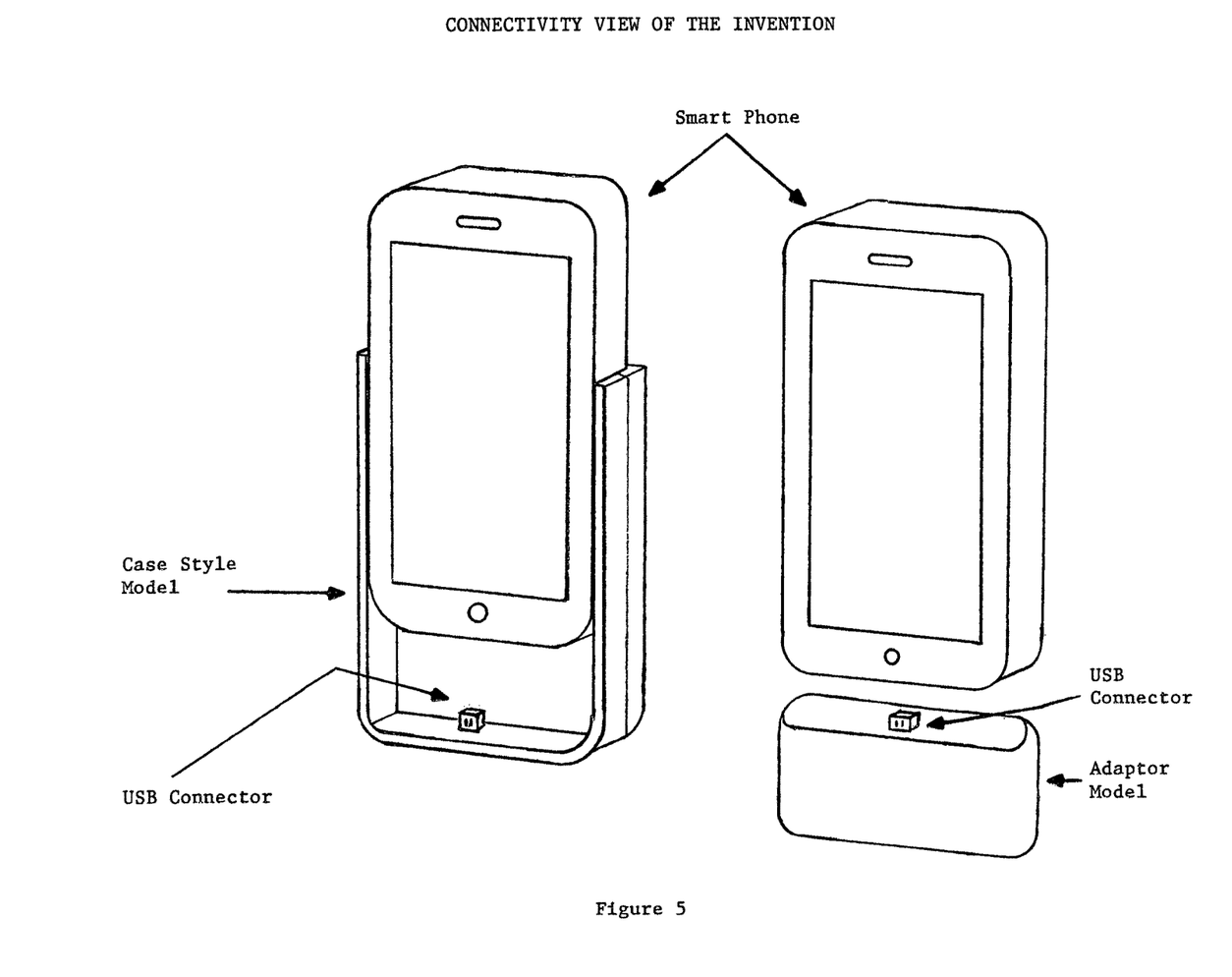
FIG. 5, is the Connectivity View of the Invention.

In FIGS. 1, 3, and 4, the MAD is shown as the case style model of the invention. In FIG. 5, the case style model of the MAD is again depicted; however, in FIG. 5, a mobile communication device (smart phone) is also shown to be partially inserted into the case style model of the MAD. As depicted in FIG. 5, the MAD will enable a mobile communication device (smart phone) to be connected by a USB connector type connector, other connector types are provided as well, including a wireless type connection such as, BLUETOOTH and WIFI. Also, the MAD can be incorporated or embedded within the actual circuitry of the mobile communication device; therefore, the connection means is internal. FIG. 5, also shows the MAD as an adaptor type model, which is also depicted to connect to a mobile communication device (smart phone) by a USB connector type connection. In both models depicted in FIG. 5, the MAD's USB connector will be directly inserted into the USB port of the mobile communication device (smart phone). Once connected, the features and functions of the MAD will be available to the mobile communication device (smart phone). Other type of mobile communication devices may be connected to both models shown in FIG. 5 as well.

Figure 2:
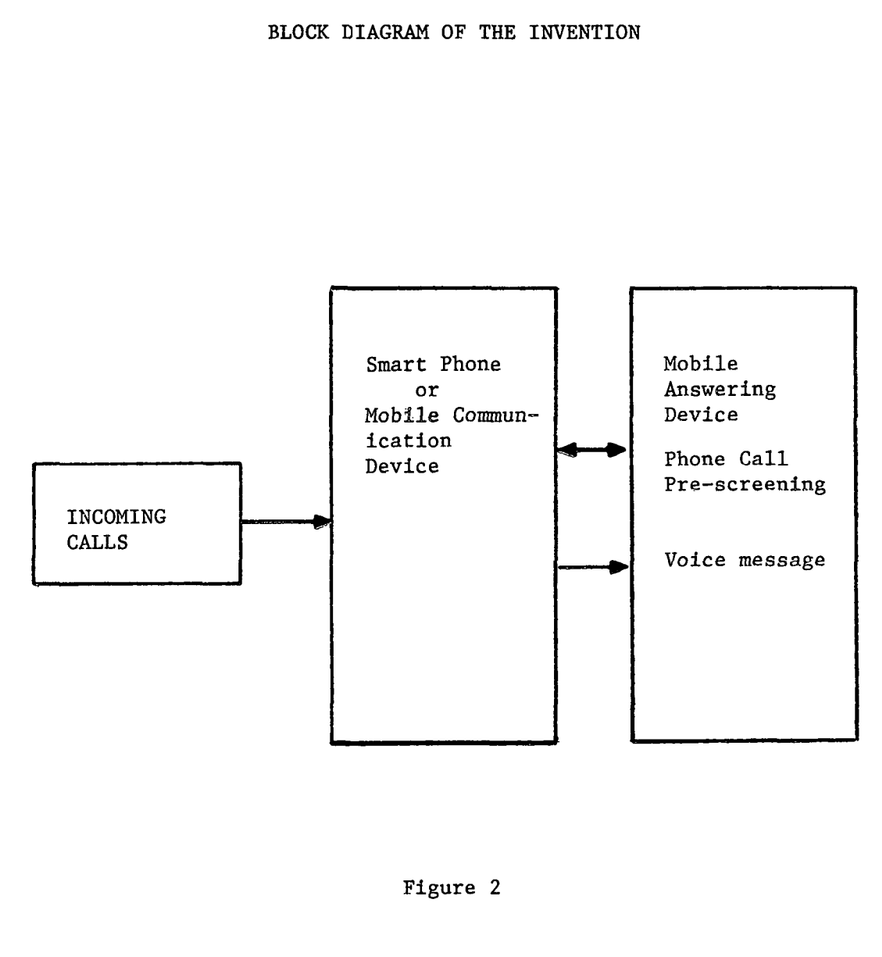
FIG. 2, is the Block Diagram of the Invention.

In FIG. 2, a flow chart is shown, this flow chart depicts the typical or basic process of a screened or monitored incoming mobile phone call once connected to the MAD. Once the MAD is connected to a mobile communication device, the user of the mobile communication device, by the MAD's provided software program or App, will have the ability to configure the MAD by setting up the number of rings before an incoming mobile phone call is answered; pre-recording an outgoing message or greeting directly on the mobile communication device; setting up the recording time and the file storage location for the incoming mobile phone call messages to be directly recorded and stored on the mobile communication device; or the user may elect to setup/configure the MAD to temporarily store the recorded incoming mobile phone call messages, then upload them to a server, platform, network, or computer for permanent storage. After the user has configured or setup the MAD, the user will be able to activate the MAD. Then, once activated, the MAD will run in the background of the mobile communication device without disturbing any other applications, software programs, or activities that are currently in use or being performed on the mobile communication device, and the MAD will continue to run in the background until the MAD is deactivated. Deactivation is simple, the user simply press the MAD's program provided deactivation button or icon, which will be conveniently located on the mobile communication device's screen or display, thereafter, the MAD will discontinue all functions and features.

As shown in FIG. 2, once the MAD is activated, an incoming mobile phone call to the mobile communication device (smart phone) will be answered by the MAD. This is accomplished by the MAD playing the pre-recorded outgoing message or greeting to the caller. And, while playing the pre-recorded outgoing message or greeting to the caller, the MAD will activate the mobile communication device's speaker or earphone piece while at the same time, deactivating the mobile communication device's microphone; therefore, the user will be able to screen or monitor the incoming mobile phone call as it is being recorded as a voice mail directly on the mobile communication device without being detected or the caller's knowledge. At the onset of the caller's voice message, a file is created and opened on the mobile communication device in a special directory that the users previously specified during the configuration/setup process. This file will permit the caller's voice message to be recorded and temporarily stored directly on the mobile communication device, and permit the stored recorded voice message to be uploaded to a server. At any point during the time that the caller is leaving a recorded voice message on the mobile communication device, the user of the mobile communication device will be able to interrupt and answer the mobile phone call. This is accomplished by the user pressing the call answer feature, which will be a button or icon provided by the MAD's program and displayed on the mobile communication device's screen or display. Once the call answering icon or button is pressed by the user, the MAD will interrupt the call recording process, activate the mobile communication device's microphone, speaker, and ear piece; thereafter, the user will be able to communication with the caller, and the caller will be able to hear the user's communication.

Figure 6:
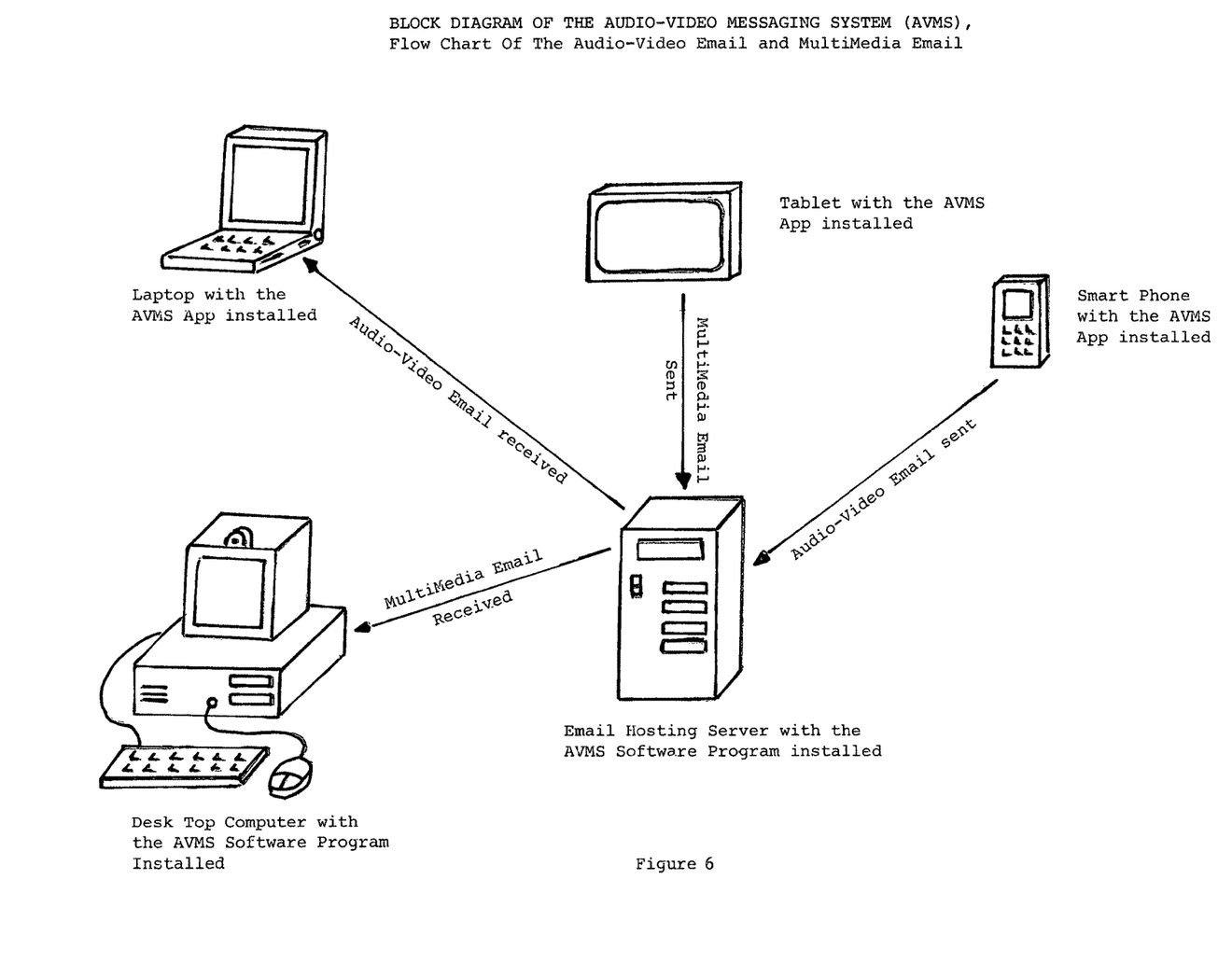
FIG. 6, is the Audio-Video Messaging System of the Invention.

In FIG. 6, a flow chart is shown that depicts the MAD's audio-video email (AVEmail) and multimedia (audio-video and text) email features and functions. Once the MAD is incorporated or embedded within the circuitry of a mobile communication device, or attached to or linked to a mobile communication device, the MAD's provided software program or application (App) will instruct and control the functions and features of the MAD and the mobile communication device. Further, the user of the mobile communication device will be able to send and receive, via the internet, AVEmails and multimedia emails, along with a targeted email address, directly from the mobile communication device to a hosting server, server, platform, network, computer, and other mobile communication devices via a communication means and the internet. And, the MAD's provided software program or app will enable the hosting server to store the AVEmail and multimedia email in a special directory and file on the hosting server. Further, a special link, containing the direct path to the stored AVEmail or multimedia email, will be created and sent or relayed to the targeted email address (recipient). Thereafter, enabling the recipient of the special link to click on it, which will link the recipient directly to the special directory and stored file (AVEmail or multimedia email) on the hosting server. Once the recipient links to the stored AVEmail or multi-media email, the MAD's provided software program, that is installed on the hosting server, will enable the recipient to select or click on an icon or button to play the stored AVEmail or multimedia email for viewing. After the AVEmail or multimedia email has played, the recipient will have the options to replay, permanently delete, store/save, reply, forward, or download the AVEmail or multimedia email to his or her mobile communication device or the targeted email address.

In FIG. 6, a desk top computer, laptop, tablet, and a smart phone is shown as the mobile communication devices that are connected to a hosting server via a communication means and the internet. The arrows in the drawing represents the communication means and the data flow. The tablet is shown sending a multimedia email to a recipient, which is the desktop computer. The tablet incorporates or embeds the MAD within its circuitry and has the MAD's provided software or app installed within it. Therefore, once the tablet sends a multimedia email along with a targeted email address to the hosting server, the hosting server will create a special directory and file for the multimedia email to be stored, then send a special link to the recipient (desktop computer). The special link will contain a direct path to the multimedia email stored on the hosting server. Once the recipient (desk top computer) receives the special link, the recipient (desk top computer) will have the option to play, reply, permanently delete, store/save, forward, or download the multimedia email.

Further, in FIG. 6, a smart phone is shown sending an audio-video electronic mail (AVEmail) to a laptop. The smart phone is connected to the hosting server via a communication means and the internet. The arrows in the drawing represents the communication means and the data flow. The smart phone incorporates or embeds the MAD within its circuitry and has the MAD's provided software program or app installed within it. Therefore, once the smart phone sends an AVEmail along with a targeted email address to the hosting server, the hosting server will create a special directory and file for the AVEmail to be stored, then send a special link to the recipient (laptop). The special link will contain a direct path to the AVEmail stored on the hosting server. Once the recipient (laptop) receives the special link, the recipient (laptop) will have the option to play, reply, permanently delete, store/save, forward, or download the AVEmail.

Further, the MAD will enable a mobile communication device to stream live audio-video electronic email (AVEmail) and multimedia (audio-video and text) email to remote servers, hosting servers, servers, platforms, networks, computers, and mobile communication devices.

Another preferred embodiment is a mobile communication device, provided with a software program or application (app), utility files, drivers, or an operating system, to instruct the mobile communication device, or control the mobile communication device's hardware or components in a way so as to enable the mobile communication device to automatically answer an incoming mobile phone call, then play a pre-recorded outgoing message or greeting, record and store the incoming call as a voice message directly on the mobile communication device, enables the user of the mobile communication device to screen or monitor the incoming mobile phone call and its message as it is being left by the caller, and to upload the recorded/stored incoming mobile phone call voice message to a server.

We claim:
1. A mobile communication system comprising:
(A) a mobile communication device;
(B) a means to automatically answer incoming mobile phone calls on said mobile communication device;
(C) a means to pre-record an outgoing message directly on said mobile communication device and to replay said outgoing message;
(D) a call recording means to record an incoming mobile phone call voice message directly on said mobile communication device;
(E) a call screening means to enable an incoming mobile phone call voice message that is being recorded on said mobile communication device to be heard for screening and monitoring without detection, and enables said incoming mobile phone call voice message to be interrupted and the call answered at any time during the recording process;

(F) a connection means to connect said mobile communication device to said mobile communication system;

(G) a communication means;

(H) a file storage means; (I) an activation and deactivation means;

(J) a means for enabling said mobile communication device to send and receive audio-video messages as actual electronic mail;

(K) a data streaming means that enables said mobile communication device to stream data;

(L) a means to enable said mobile communication device to record, send and receive multimedia email comprising, audio-video and text messages;

(M) a software program comprising:
  (i) instructions for controlling the activation and deactivation means;
  (ii) instructions for controlling the call screening means ability to activate the mobile communication device's speaker and earphone piece while deactivating the mobile communication device's microphone so that screened and monitored incoming mobile phone call voice messages can be heard without detection while being recorded; and providing a step for activating the mobile communication device's microphone, speaker, and earphone piece, while interrupting the call recording means to enable said recorded incoming mobile phone call voice message to be answered;
  (iii) instructions for controlling and instructing the file storage means to enable temporary and permanent storage of said recorded incoming mobile phone call voice messages directly on said mobile communication device;
  (iv) instructions for controlling the communication means to enable said recorded incoming mobile phone call voice message to be uploaded to a server.

2. The mobile communication device, as outlined in claim 1, wherein said mobile communication device is a smart phone.

3. The mobile communication system, as outlined in claim 1, wherein said mobile communication system is the server.

4. The mobile communication system, as outlined in claim 1, wherein said mobile communication system is an electronic circuit that is incorporated within a circuitry of a mobile communication device.

5. The mobile communication system, as outlined in claim 1, wherein said software program is installed within said mobile communication device.

6. The mobile communication system, as outlined in claim 1, wherein said mobile communication system enables said recorded voice message to be stored directly on a mobile communication device, and uploaded to the server for storage.

7. The mobile communication system, as outlined in claim 1, wherein said mobile communication system has an Audio-Video Messaging Service feature that enables said mobile communication device to send and receive prerecorded audio-video electronic mail over the internet, and to send and receive multimedia audio, video, and/or text email over the internet.

8. The mobile communication system, as outlined in claim 1, wherein said mobile communication system is a network, and said network has an Audio-Video Messaging Service feature that enables a mobile communication device to send and receive prerecorded audio-video electronic mail over the internet, and to send and receive multimedia audio, video, and/or text email over the internet.

9. The mobile communication system, as outlined in claim 1, wherein said mobile communication system enables audio-video electronic mail and multimedia audio, video, and/or text email to be stored directly on a mobile communication device, and to upload said audio-video electronic mail and multimedia audio, video, and/or text email to a server for storage.

10. The mobile communication system, as outlined in claim 1, wherein said communication means enables said mobile communication device to communicate with the hosting server.

11. The mobile communication system, as outlined in claim 1, wherein said software program comprising:
  (A) instructions that enable said mobile communication device to send and receive audio-video electronic mail and multimedia audio, video, and/or text email, along with a targeted email address, to and from said hosting server;
  (B) instructions that enable said hosting server to store said audio-video electronic mail and multimedia audio, video, and/or text email, sent by said mobile communication device, in a special directory and file on said hosting server;
  (C) instructions that enable said hosting server to create a email link that provides a direct path to said audio-video electronic mail and multimedia audio, video, and/or text email stored on said hosting server;
  (D) instructions that enable said hosting server to relay or send said special email link containing the direct path to said audio-video electronic mail or multimedia audio, video, and/or text email to said targeted email address;
  (E) instructions that enable said hosting server to play said audio-video electronic mail or multimedia audio, video, and/or text email upon request by selecting an icon or button;
  (G) instructions that enable said hosting service to permit a reply to said audio-video electronic mail or multimedia audio, video, and/or text email stored on said hosting server;
  (H) instructions that enable said hosting server to download said stored audio-video electronic mail or multimedia audio, video, and/or text email to said targeted email address, or to a mobile communication device.

12. The mobile communication system, as outlined in claim 1, wherein said mobile communication device is a cell phone.

13. The mobile communication system, as outlined in claim 1, wherein said mobile communication device is a tablet.

14. The mobile communication system, as outlined in claim 1, wherein said mobile communication device is a laptop.

15. The mobile communication system, as outlined in claim 1, wherein said mobile communication device is a smart watch.

16. The mobile communication system, as outlined in claim 1, wherein said connection means is a wireless connection means.

17. The mobile communication system, as outlined in claim 1, wherein said mobile communication system provides an application that instructs and controls the functions and features of said mobile communication system.

18. The mobile communication system, as outlined in claim 1, wherein said mobile communication device is programmed with an application to enable said mobile communication device to automatically answer an incoming mobile phone call and play an outgoing message; and to screen and monitor an incoming mobile phone call; and to record and store said incoming mobile phone call as a voice message directly on said mobile communication device or server; and to upload said stored incoming mobile phone call voice message to the hosting server, network, or platform.

* * * * *